(12) United States Patent
Zhang et al.

(10) Patent No.: US 7,629,902 B2
(45) Date of Patent: Dec. 8, 2009

(54) MIMO WIRELESS PRECODING SYSTEM ROBUST TO POWER IMBALANCE

(75) Inventors: Jianzhong Zhang, Irving, TX (US); Cornelius Van Rensburg, Dallas, TX (US); Farooq Khan, Allen, TX (US); Bruno Clerckx, Seoul (KR); Juho Lee, Suwon-si (KR); Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/155,235

(22) Filed: May 30, 2008

(65) Prior Publication Data

US 2008/0303699 A1 Dec. 11, 2008

Related U.S. Application Data

(60) Provisional application No. 60/929,025, filed on Jun. 8, 2007, provisional application No. 60/929,454, filed on Jun. 28, 2007.

(51) Int. Cl.
*H03M 7/00* (2006.01)
(52) U.S. Cl. .................. 341/106; 375/260; 708/607; 704/238
(58) Field of Classification Search ............... 375/267, 375/260; 708/520, 607; 704/238
See application file for complete search history.

(56) References Cited

U.S. PATENT DOCUMENTS

| | | | | |
|---|---|---|---|---|
| 5,574,957 | A  * | 11/1996 | Barnard et al. | ............... 419/67 |
| 6,006,111 | A  * | 12/1999 | Rowland | ................... 455/561 |
| 6,342,810 | B1 * | 1/2002 | Wright et al. | ................ 330/51 |
| 6,345,126 | B1 * | 2/2002 | Vishwanath et al. | ........ 382/253 |
| 7,139,539 | B2 | 11/2006 | Chun | |

OTHER PUBLICATIONS

3GPP TSG RAN WG1 Meeting #49, R1-072597, "*Way Forward on 4-Tx Antenna Codebook for SU-MIMO*", Kobe, Japan, Mar. 26-30, 2007.
3GPP TSG RAN WG1 Meeting #49, R1-072581, "*Way Forward on Codebook design for 4Tx SU MIMO*", Kobe, Japan, May 7-11, 2007.
3GPP TSG RAN WG1 Meeting #49, R1-072582, "*Way Forward on SU MIMO Codebook design for 4Tx dual polarized antennas*", Kobe, Japan, May 7-11, 2007.

* cited by examiner

*Primary Examiner*—Lam T Mai

(57) ABSTRACT

The present invention relates to methods and apparatus for preventing power imbalance in a multiple input multiple output (MIMO) wireless precoding system. According to one aspect of the present invention, a codebook is constructed with a first subset of codewords that are constant modulus matrices, and a second subset of codewords that are non-constant modulus matrices. A mapping scheme is established between the first subset of codewords and the second subset of codewords. When a unit of user equipment feeds back a first codeword that is a non-constant modulus matrix, the Node-B may replace the first codewords with a second codeword that is selected from the first subset of codewords and that corresponds to the first codeword in accordance with the mapping scheme.

32 Claims, 9 Drawing Sheets

MIMO WIRELESS PRECODING SYSTEM ROBUST TO POWER IMBALANCE

CLAIM OF PRIORITY

This application makes reference to, incorporates the same herein, and claims all benefits accruing under 35 U.S.C. §119 from provisional applications earlier filed in the U.S. Patent & Trademark Office on 8 Jun. 2007 and there duly assigned Ser. No. 60/929,025, and on 28 Jun. 2007 and there duly assigned Ser. No. 60/929,454, respectively.

BACKGROUND OF THE INVENTION

1. Field of the Invention

The present invention relates to methods and apparatus for preventing power imbalance in a multiple input multiple output (MIMO) wireless preceding system.

2. Description of the Related Art

A new generation cellular mobile communication system has to provide wireless network applications with high-speed information transmission. Multiple Input Multiple Output (MIMO) schemes use multiple transmit antennas and multiple receive antennas to improve the capacity and reliability of a wireless communication channel. As disclosed in "Way Forward on 4-Tx Antenna Codebook for SU-MIMO", 3GPP R1-072597, published by Texas Instruments, Motorola, Nokia, Ericsson, NTT DoCoMo, Panasonic, Freescale Semiconductor, Nortel, Huawei, Broadcom, Comsys, Marvell Semiconductor, Nokia Siemens Networks, InterDigital, Mitsubishi Electric, Sharp, "Way Forward on Codebook design for 4Tx SU MIMO", 3GPP R1-072581, published by Samsung, ZTE, ETRI, Qualcomm, CHTTL, ITRI, Magnolia, Broadband, ASUSTec, Sunplus mMobile Inc., CGC, "Way Forward on SU MIMO Codebook design for 4Tx dual polarized antennas", 3GPP R1-072582, published by Samsung, ZTE, ETRI, ITRI, ASUSTeK, CHTTL, Magnolia Broadband, Sunplus mMobile Inc., CGC, NTT DoCoMo, Mitsubishi Electric, single user MIMO (SU-MIMO) precoder has been designed to improve the spectral efficiency of a wireless system.

In all these prior designs, however, the constant modulus (CM) principle is not strictly followed. Constant modulus (CM) principle means the energy on each antenna is the same, for any given subcarrier in the whole OFDM band. Therefore, power imbalance does not exist if the constant modulus principle is met. As a result, a Node-B (i.e., base station) may experience power imbalance at the power amplifiers (PA) of different Node-B transmission antenna, which is detrimental to system performance. Although the Node-B scheduler may alleviate the power imbalance problem by grouping units of user equipment (UE) with different precoding spatial vectors and matrices in a way such that the total transmission power of the group is roughly balanced across different transmission antennas, the resulting loss of scheduling flexibility is undesirable from the Node-B operation and performance viewpoint.

SUMMARY OF THE INVENTION

It is therefore an object of the present invention to provide improved methods and apparatus for wireless communication.

It is another object of the present invention to provide methods and apparatus for preventing power imbalance without sacrificing the scheduling flexibility.

According to one aspect of the present invention, a method for communication is provided. In this method, a codebook is generated. The code book includes a first set of codewords and a second set of codewords. Each one of the first set of codewords is a constant modulus matrix, and each one of the second set of codewords is a non-constant modulus matrix. A mapping scheme is established from the codewords in the first set of codewords to the codewords in the second set of codewords. A first node selects a first codeword from the codebook in dependence upon a condition of a transmission channel between the first node and a second node, and transmits information regarding the first codeword to the second node. The second node determines whether the first codeword is a constant modulus matrix or a non-constant modulus matrix. When the first codeword selected by the first node is a non-constant modulus matrix, the second node replaces the first codeword with a second codeword that is selected from the first set of codewords and that corresponds to the first codeword in accordance with the mapping scheme established.

The second node may be constructed with four transmission antennas, and the codebook for a transmission rank-four of the four transmission antennas may include four matrices $W_1$, $W_2$, $W_3$ and $W_4$ established by:

$$W_1 = \begin{bmatrix} A & 0 \\ 0 & B \end{bmatrix}$$

$$W_2 = \begin{bmatrix} C & 0 \\ 0 & D \end{bmatrix}$$

$$W_3 = [E]$$

$$W_4 = [F]$$

where each of A, B, C and D is a 2×2 constant modulus matrix, and each of E and F is a 4×4 constant modulus matrix.

Each element of A, B, C and D may be a symbol selected from a set of Quadrature phase-shift keying (QPSK) modulation symbols $\{1,-1,j,-j\}$, and a set of order-8 phase-shift keying (8PSK) modulation symbols $$\left\{1, -1, j, -j, \frac{1}{\sqrt{2}}(1+j), \frac{1}{\sqrt{2}}(1-j), \frac{1}{\sqrt{2}}(-1+j), \frac{1}{\sqrt{2}}(-1-j)\right\}.$$

The codebook for a transmission rank-one of the four transmission antennas may include sixteen matrices, with each of the sixteen matrices being one column selected from the columns of the four matrices $W_1$, $W_2$, $W_3$ and $W_4$.

The codebook for a transmission rank-two of the four transmission antennas may include sixteen matrices, with each of the sixteen matrices being one selected from all possible 4×2 submatrices of the four matrices $W_1$, $W_2$, $W_3$ and $W_4$.

The codebook for a transmission rank-four of the four transmission antennas may include sixteen matrices, with each of the sixteen matrices being one selected from all possible 4×3 submatrices of the four matrices $W_1$, $W_2$, $W_3$ and $W_4$.

The four transmission antennas may be dual polarized antennas that are oriented vertically and horizontally.

Alternatively, the four transmission antennas may be dual polarized antennas that are oriented with 45 degree and −45 degree.

According to another aspect of the present invention, a method for communication is provided. In this method, codebooks for various transmission ranks in a communication system are generated. Each of the codebooks may be one of a first type codebook in which all of the codewords are constant modulus matrices, and a second type codebook in which a first half of the codewords are constant modulus matrices, and a second half of the codewords are non-constant modulus matrices. In each one of the second type codebooks, a mapping scheme is established from the first half of the codewords to the second half of the codewords. A first node transmits information regarding a transmission rank and information regarding a first codeword selected from a codebook corresponding to the transmission rank to the second node, with the first codeword being selected in dependence upon a condition of a transmission channel between first node and the second node in a multiple input multiple output communication system. The second node determines whether the first codeword selected by the first node is a constant modulus matrix or a non-constant modulus matrix. When the second node determines that the first codeword selected by the first node is a constant modulus matrix, the second node precodes a data packet by using the first codeword and transmitting the precoded data packet to the first node. When the second node determines that the first codeword selected by the first node is a non-constant modulus matrix, the second node precodes a data packet by using a second codeword that is selected from the first half of the codewords in the codebook and that corresponds to the first codeword in accordance with the mapping scheme established corresponding to the codebook, and transmits the precoded data packet to the first node.

The second node may transmit a control signal along with the precoded data packet to the first node. In response to the control signal and the data packet received, the first node determines whether the control signal includes information regarding the codeword used to precode the data packet. When the control signal includes information regarding the codeword used to precode the data packet, the first node decodes the data packet by using the codeword corresponding to the information comprised in the control signal. When the control signal does not include information regarding the codeword used to precode the data packet, the first node determines whether the codebook corresponding to the transmission rank is the first type codebook. If the codebook corresponding to the transmission rank is the first type codebook, the first node decodes the data packet by using the first codeword selected by the first node. If the codebook corresponding to the transmission rank is the second type codebook, the first node blindly decodes the data packet by using both of the first codeword selected by the first node and the second codeword selected by the second node.

According to yet another aspect of the present invention, a method for communication is provided. In this method, a codebook is generated. The codebook includes a plurality of codewords, with each of the codewords being a constant modulus matrix. A reference signal is transmitted from a second node to a first node via a plurality of transmission antennas. In response to the reference signal received, the first node feeds back a polarization indicator indicating whether the first node receives energy from a first subset of the transmission antennas that are oriented with a first polarization, or from a second subset of the transmission antennas that are oriented with a second polarization, or from both of the first subset and the second subset of the transmission antennas. The first node calculates a channel quality indicator and a preceding matrix index by using one of two alternatives. In a first alternative, the channel quality indicator and the preceding matrix index are calculated by using the codewords in the codebook. In a second alternative, the channel quality indicator and the precoding matrix index are calculated in dependence upon the polarization indicator. When the polarization indicator indicates that the first node receives energy from the first subset of the transmission, the first node revises all of the codewords in the codebook by replacing the rows that correspond to the second subset of the transmission antennas with zero values, and calculates the channel quality indicator and the precoding matrix index by using the revised codewords. When the polarization indicator indicates that the first node receives energy from the second subset of the transmission, the first node revises all of the codewords in the codebook by replacing the rows that correspond to the first subset of the transmission antennas with zero values, and calculates the channel quality indicator and the precoding matrix index by using the revised codewords. When the polarization indicator indicates that the first node receives energy from both of the first subset and the second subset of the transmission antennas, the first node calculates the channel quality indicator and the precoding matrix index by using the codewords in the codebook without any revision. Then, the first node transmits the calculated channel indicator and the precoding matrix index, and an alternative indicator indicating whether the first alternative or the second alternative is used for calculating the channel indicator and the precoding matrix index, to the second node. In response to the channel indicator, the precoding matrix index and the alternative indicator received, the second node precodes and transmits a data packet in dependence upon the alternative indicator. When the alternative indicator indicates that the first alternative is used for calculating the channel indicator and the precoding matrix index, the second node precodes the data packet by using a codeword selected from the plurality of codewords in the codebook in accordance with the precoding matrix index, and transmits the precoded data packet via the plurality of transmission antennas. When the alternative indicator indicates that the second alternative is used for calculating the channel indicator and the precoding matrix index, the second node precodes the data packet by using a codeword selected from the plurality of codewords in the codebook in accordance with the preceding matrix index, and transmits the precoded data packet in dependence upon the polarization indicator. When the polarization indicator indicates that the first node receives energy from the first subset of the transmission antennas, the second node transmits the precoded data packet via at least one of the first subset of the transmission antennas. When the polarization indicator indicates that the first node receives energy from the second subset of the transmission antennas, the second node transmits the precoded data packet via at least one of the second subset of the transmission antennas. When the polarization indicator indicates that the first node receives energy from both of the first subset and the second subset of the transmission antennas, the second node transmits the precoded data packet via at least one of the first subset and the second subset of transmission antennas.

The first node may feed back the polarization indicator semi-statically.

Alternatively, the first node may dynamically feed back one polarization indicator for each subframe across all subbands.

Still alternatively, the first node may dynamically feed back one polarization indicator for each subband.

In addition, when the second node detects a power amplifier imbalance, and the second alternative was used to calculate the channel quality indicator and the precoding matrix index, the second node precodes and transmits the data packet, for a set of subbands, by using the original codebook without any revision, and precodes and transmits the data packet for the other subbands by using the revised codebook.

According to still another aspect of the present invention, a method for transmitting data is provided. In this method, a plurality of signals output from respective sectors of a signal generator are distributed in accordance with a distributor matrix A at a distributor in a transmitter constructed with four transmission antennas. The distributed signals are amplified by using a plurality of power amplifiers in a power amplifier pool section. The amplified signals are combined in accordance with a combiner matrix C at a combiner, with $C = A^{-1}$. Finally, the combined signals are transmitted via the four transmission antennas.

The distributor matrix A may be established by:

$$A = \begin{bmatrix} x & 0 & x & 0 \\ 0 & x & 0 & x \\ x & 0 & x & 0 \\ 0 & x & 0 & x \end{bmatrix}$$

where x is a constant modulus symbol, and may be selected from a set of Binary phase-shift keying (BPSK) modulation symbols, a set of Quadrature phase-shift keying (QPSK) modulation symbols, a set of order-8 phase-shift keying (8PSK) modulation symbols, and a set of order-16 phase-shift keying (16PSK) modulation symbols.

Alternatively, the distributor matrix A may be established by:

$$A = \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}.$$

According to still yet another aspect of the present invention, a method for transmitting data is provided. In this method, a plurality of signals output from respective sectors of a signal generator are scrambled by a plurality scramblers to make the signals independent from each other. The scrambled signals are distributed by a distributor in accordance with a distributor matrix. The distributed signals are amplified by a plurality of power amplifiers in a power amplifier pool section. Each of the amplifier signals are combined in accordance with a combiner matrix by a combiner. The combined signals are descrambled by a plurality of descramblers. Finally, the descrambled signals are transmitted via a plurality of antennas.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
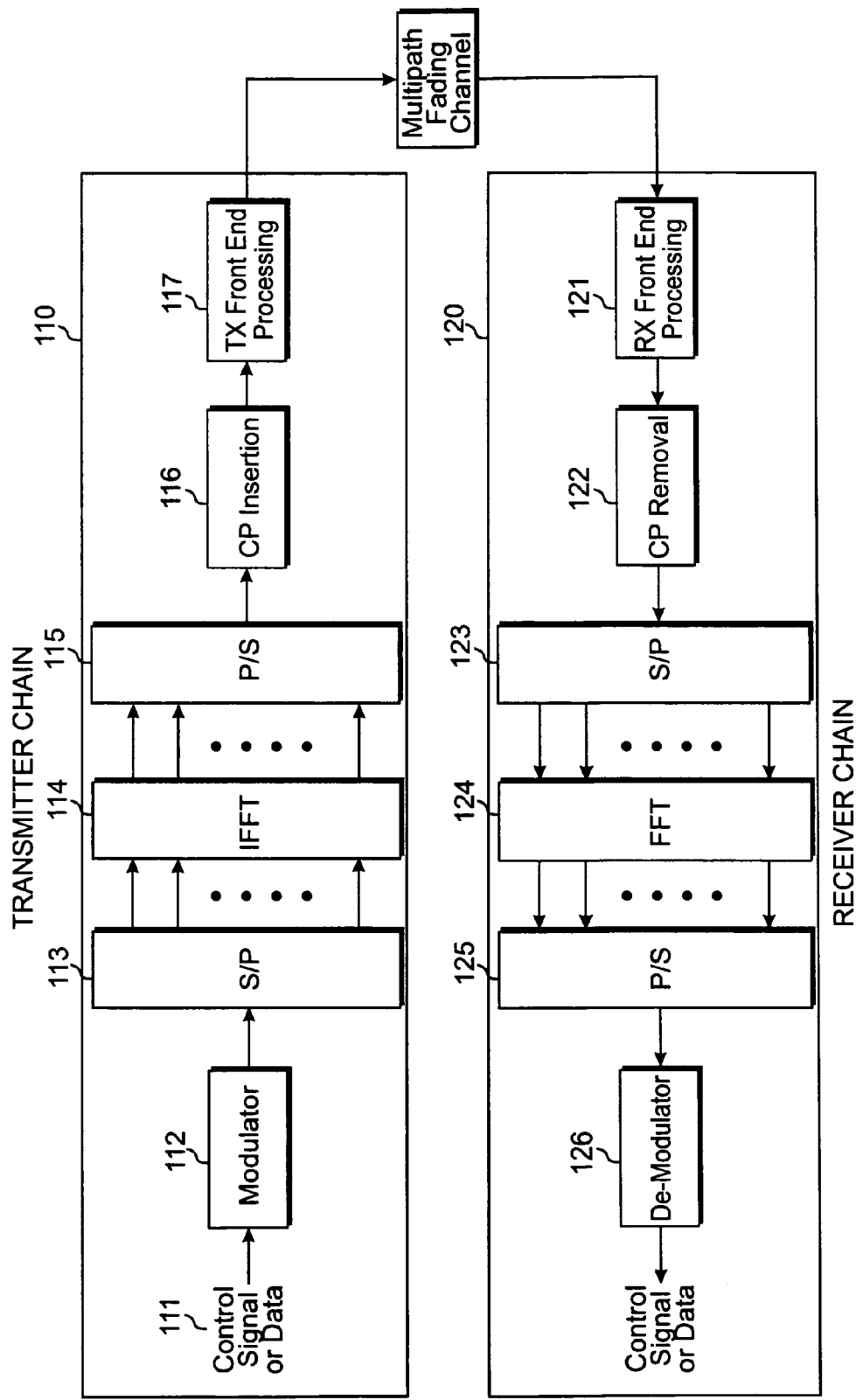
FIG. 1 schematically illustrates an Orthogonal Frequency Division Multiplexing (OFDM) transceiver chain.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117 and at least one antenna (not shown), or fixed wire or cable. The signal is transmitted from one or more antennas driven by unit 117 via the atmosphere and is subjected to multipath fading to arrive at a receiver. Note that the multipath fading channel illustrated in FIG. 1 refers to a transmission media (for example, atmosphere), and the multipath fading channel is not a component connected to the receiver, nor to the transmitter. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
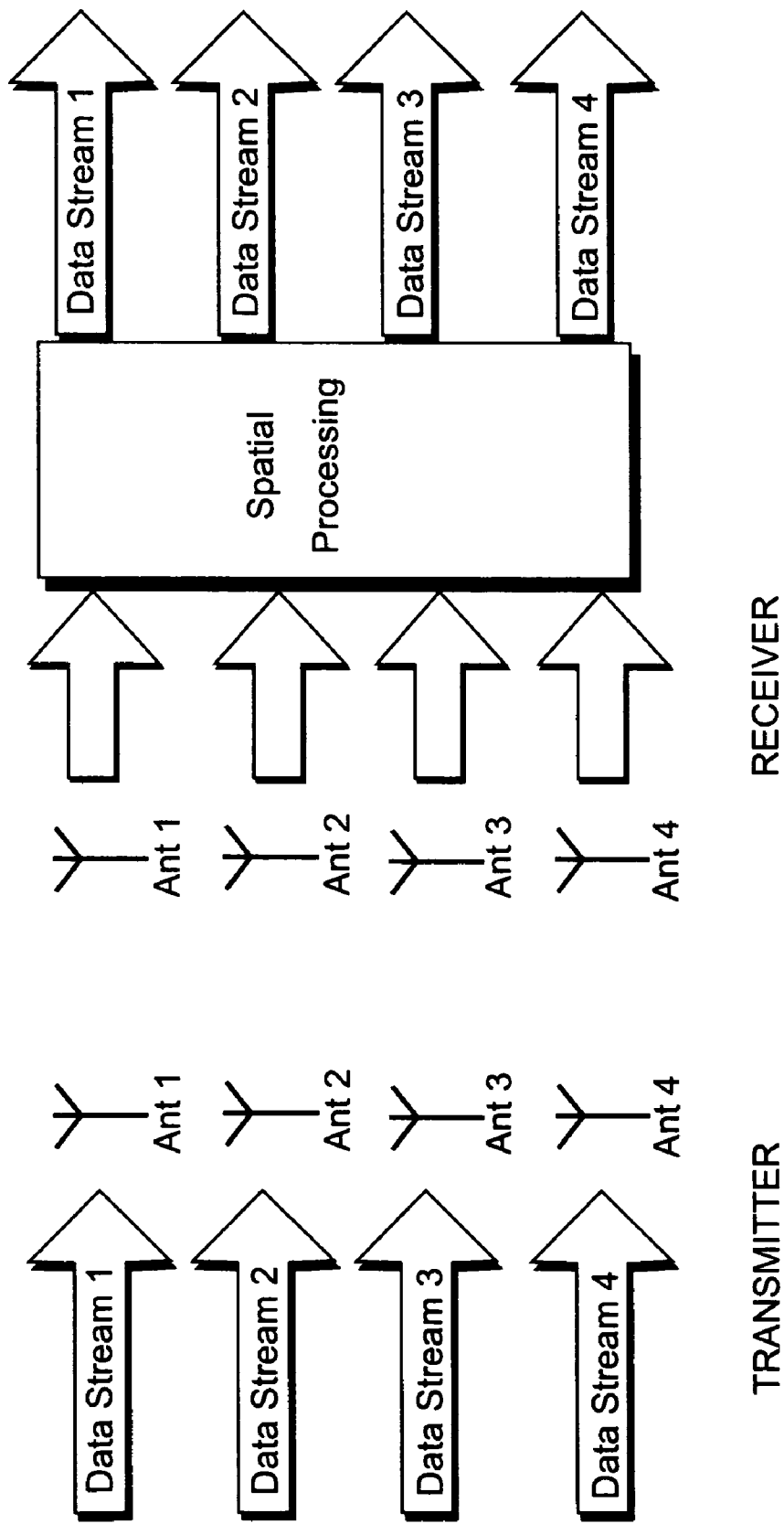
FIG. 2 schematically illustrates a Multiple Input Multiple Output (MIMO) transceiver chain.

Multiple Input Multiple Output (MIMO) schemes use multiple transmission antennas and multiple receive antennas to improve the capacity and reliability of a wireless communication channel. A MIMO system promises linear increase in capacity with K where K is the minimum of number of transmit (M) and receive antennas (N), i.e. K=min(M,N). A simplified example of a 4×4 MIMO system is shown in FIG. 2. In this example, four different data streams are transmitted separately from four transmission antennas. The transmitted signals are received at four receive antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmission antennas (e.g., diagonal Bell Laboratories Layered Space-Time (D-BLAST)) and also beamforming schemes such as Spatial Division multiple Access (SDMA).

The MIMO channel estimation consists of estimating the channel gain and phase information for links from each of the transmission antennas to each of the receive antennas. Therefore, the channel for M×N MIMO system consists of an N×M matrix:

$$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{M2} & \ldots & h_{NM} \end{bmatrix} \quad (1)$$

where $h_{ij}$ represents the channel gain from transmission antenna j to receive antenna i. In order to enable the estimations of the elements of the MIMO channel matrix, separate pilots are transmitted from each of the transmission antennas.

Figure 3:
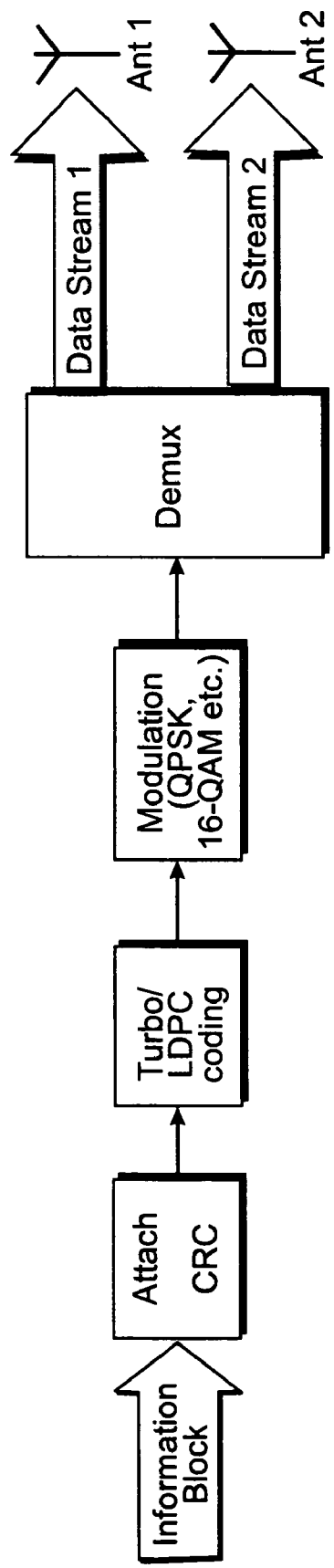
FIG. 3 schematically illustrates a single codeword MIMO transmission scheme.

An example of single-code word MIMO scheme is given in FIG. 3. In case of single-code word MIMO transmission, a cyclic redundancy check (CRC) is added to a single information block and then coding, for example, using turbo codes and low-density parity check (LDPC) code, and modulation, for example, by quadrature phase-shift keying (QPSK) modulation scheme, are performed. The coded and modulated symbols are then demultiplexed for transmission over multiple antennas.

Figure 4:
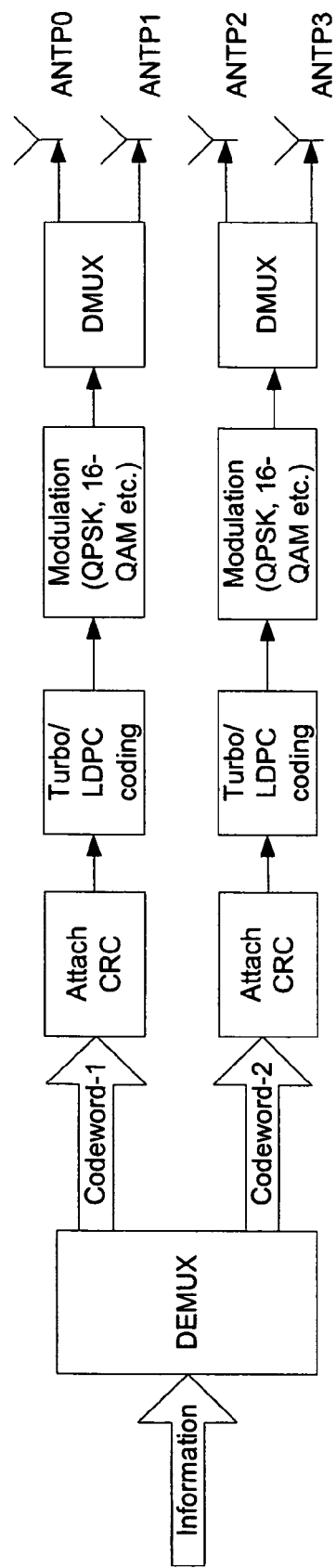
FIG. 4 schematically illustrates a multiple codeword MIMO transmission scheme.

In case of multiple codeword MIMO transmission, shown in FIG. 4, the information block is de-multiplexed into smaller information blocks. Individual CRCs are attached to these smaller information blocks and then separate coding and modulation is performed on these smaller blocks. After modulation, these smaller blocks are respectively demultiplexed into even smaller blocks and then transmitted through corresponding antennas. It should be noted that in case of multi-code word MIMO transmissions, different modulation and coding can be used on each of the individual streams, and thus resulting in a so-called Per Antenna Rate Control (PARC) scheme. Also, multi-code word transmission allows for more efficient post-decoding interference cancellation because a CRC check can be performed on each of the code words before the code word is cancelled from the overall signal. In this way, only correctly received code words are cancelled, and thus avoiding any interference propagation in the cancellation process.

Figure 5:
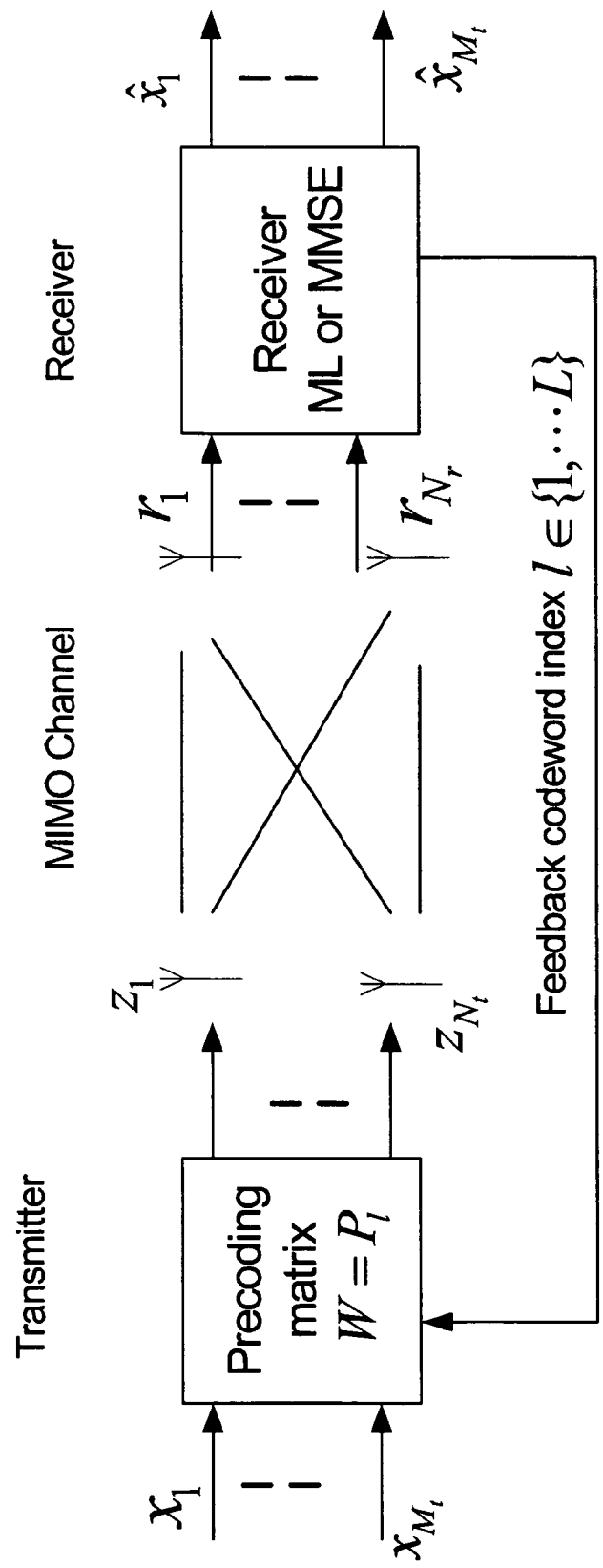
FIG. 5 schematically illustrates a feedback-based MIMO preceding and decoding system.

In a closed-loop MIMO preceding system, for each transmission antenna size we construct a set of preceding matrices (i.e., codewords) and let this set be known at both the Node-B (i.e., the base station) and the user equipment (UE). We call this set of matrices as the "codebook" and denote it $P=\{P_1, \ldots, P_L\}$ Here $L=2^q$ denotes the size of the codebook and q is the number of (feedback) bits needed to index the codebook. In a limited feedback precoding MIMO system illustrated in FIG. 5, once the codebook is specified for a MIMO system, the receiver observes a channel realization, selects the best precoding matrix (i.e., codeword) to be used at the moment, and feeds back the index of the codeword to the transmitter.

A good codebook design is essential in achieving the improved spectral efficiency promised by the MIMO precoding method. One example codebook is given in 3GPP R1-072582, entitled "Way Forward on SU MIMO Codebook design for 4Tx dual polarized antennas", and is specially designed for a dual-polarized channel where the Node-B transmission antennas are either vertical-horizontal polarized or +/−45 polarized. The example codebook includes four precoding matrices $W_1$, $W_2$, $W_3$ and $W_4$, that are listed as follows:

$$W_1 = I = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \quad (2)$$

$$W_2 = \frac{1}{\sqrt{2}} \begin{bmatrix} 1 & 1 & 0 & 0 \\ 1 & -1 & 0 & 0 \\ 0 & 0 & 1 & 1 \\ 0 & 0 & 1 & -1 \end{bmatrix},$$

$$W_3 = \frac{1}{\sqrt{2}} \begin{bmatrix} 1 & 1 & 0 & 0 \\ j & -j & 0 & 0 \\ 0 & 0 & 1 & 1 \\ 0 & 0 & j & -j \end{bmatrix},$$

$$W_4 = 0.5 * \begin{bmatrix} 1 & 1 & 1 & 1 \\ 1 & j & -1 & -j \\ 1 & -1 & 1 & -1 \\ 1 & -j & -1 & j \end{bmatrix}$$

Rank adaptation should be used to improve the link quality of low geometry UEs. Consequently, we need a rule to map from square matrix codebook to transmit codebook (vector, or vector pairs) to incorporate rank adaptation technology. We propose the mapping rule in Table 1.

TABLE 1

Dual Polarized Codebook

| Transmit Codebook index | Rank 1 | Rank 2 | Rank 3 | Rank 4 |
|---|---|---|---|---|
| 1 | Matrix 1, column 1 | Matrix 1, column {1, 2} | Matrix 1, column {1, 2, 3} | Matrix 1 |
| 2 | Matrix 1, column 2 | Matrix 1, column {1, 3} | Matrix 1, column {1, 2, 4} | Matrix 2 |
| 3 | Matrix 1, column 3 | Matrix 1, column {1, 4} | Matrix 1, column {1, 3, 4} | Matrix 3 |
| 4 | Matrix 1, column 4 | Matrix 1, column {2, 3} | Matrix 1, column {2, 3, 4} | Matrix 4 |
| 5 | Matrix 2, column 1 | Matrix 1, column {2, 4} | Matrix 2, column {1, 2, 3} | n/a |
| 6 | Matrix 2, column 2 | Matrix 1, column {3, 4} | Matrix 2, column {1, 2, 4} | n/a |
| 7 | Matrix 2, column 3 | Matrix2, column {1, 3} | Matrix 2, column {1, 3, 4} | n/a |
| 8 | Matrix 2, column 4 | Matrix 2, column {1, 4} | Matrix 2, column {2, 3, 4} | n/a |
| 9 | Matrix 3, column 1 | Matrix 2, column {2, 3} | Matrix 3, column {1, 2, 3} | n/a |
| 10 | Matrix 3, column 2 | Matrix 2, column {2, 4} | Matrix 3, column {1, 2, 4} | n/a |
| 11 | Matrix 3, column 3 | Matrix 3, column {1, 3} | Matrix 3, column {1, 3, 4} | n/a |
| 12 | Matrix 3, column 4 | Matrix 3, column {1, 4} | Matrix 3, column {2, 3, 4} | n/a |
| 13 | Matrix 4, column 1 | Matrix 3, column {2, 3} | Matrix 4, column {1, 2, 3} | n/a |

TABLE 1-continued

Dual Polarized Codebook

| Transmit Codebook index | Rank 1 | Rank 2 | Rank 3 | Rank 4 |
|---|---|---|---|---|
| 14 | Matrix 4, column 2 | Matrix 3, column {2, 4} | Matrix 4, column {1, 2, 4} | n/a |
| 15 | Matrix 4, column 3 | Matrix 4, column {1, 3} | Matrix 4, column {1, 3, 4} | n/a |
| 16 | Matrix 4, column 4 | Matrix 4, column {2, 4} | Matrix 4, column {2, 3, 4} | n/a |

One problem of the codebook shown in the above example is that the constant modulus (CM) principle is not strictly followed. As a result, the Node-B may experience power imbalance at the power amplifiers (PA) of different Node-B transmission antennas. The power imbalance may be detrimental to system performance. Although Node-B scheduler may alleviate the power imbalance problem by grouping UEs with different precoding spatial vectors/matrices in a way such that the total transmission power of the group is roughly balanced across different transmission antennas, the resulting loss of scheduling flexibility is undesirable from the Node-B operation and performance viewpoint.

We show in the invention how this power imbalance issue can be resolved without sacrificing the scheduling flexibility at the Node-B.

In this invention, we propose an approach that helps the Node-B mitigate the power imbalance problem without sacrificing the scheduling flexibility. In this approach, we apply a codebook that includes two subsets, where the first subset consists of codewords generated from constant modulus (CM) vectors/matrices (A CM matrix is a matrix where all elements are complex numbers of same amplitude), and the second subset consists of codewords generated from vectors/matrices that may not be fully CM-compliant. In addition, a one-to-one mapping is established between the codewords of these two subsets. When a UE feeds back a CM codeword, no additional action is required at the Node-B. On the other hand, if a UE feedbacks a non-CM codeword, the Node-B have a choice of replacing this non-CM codeword with a codeword that belongs to the CM subset. This replacement is based on the aforementioned predetermined mapping between the CM and non-CM subsets of the codebook.

In a first embodiment according to the principles of the current invention, the codebook is generated from four matrices, where at least one of the matrices is a CM matrix, and at least one of the matrices is not a CM matrix. One example of such a codebook structure is given by:

$$W_1 = \begin{bmatrix} A & 0 \\ 0 & B \end{bmatrix} \quad (6)$$

$$W_2 = \begin{bmatrix} C & 0 \\ 0 & D \end{bmatrix}$$

$$W_3 = [E]$$

$$W_4 = [F]$$

In this codebook, A, B, C, D are 2×2 CM matrices. That is, all of the elements in these 2×2 CM matrices have the same amplitude. Examples of CM elements are Quadrature phase-shift keying (QPSK) modulation symbols, or Binary phase-shift keying (BPSK) modulation symbols, or order-8 phase-shift keying (8PSK) modulation symbols, or order-16 phase-shift keying (16PSK) modulation symbols. Note that order-16 Quadrature amplitude modulation (QAM) modulation symbols are not constant modulus matrices, and therefore they can not be used for A, B, C, D in the above codebook. QPSK modulation symbols belong to the set $\{1, -1, j, -j\}$. 8PSK modulation symbols belong to the set $$\left\{1, -1, j, -j, \frac{1}{\sqrt{2}}(1+j), \frac{1}{\sqrt{2}}(1-j), \frac{1}{\sqrt{2}}(-1+j), \frac{1}{\sqrt{2}}(-1-j)\right\}.$$

E and F are 4×4 CM matrices.

The method of generating the codebook from the matrices is described below. First, there are four codebooks for ranks 1, 2, 3 and 4, respectively. Each of the codebooks for ranks 1, 2 and 3 has 16 codewords. The codebook for rank 4 has four codewords that are the four matrices $W_1$, $W_2$, $W_3$ and $W_4$ following the general structure shown in Equation (6). The rank 1 codebook consists of sixteen matrices, with each matrix being a unique column vector selected from the four matrices $W_1$, $W_2$, $W_3$ and $W_4$ following the general structure shown in Equation (6). The rank 2 codebook consists of a subset of the all possible size 4×2 submatrices of the four matrices $W_1$, $W_2$, $W_3$ and $W_4$ following the general structure shown in Equation (6); and the size of the subset is 16. The rank 3 codebook consists of a subset of the all possible size 4×3 submatrices of the four matrices follow the general structure shown above. The size of the subset is 16.

An additional constraint applies when generating the codebooks from the four matrices. For a given rank n (n=1,2,3,4), the resulting codebook C(n) satisfies either one of the following conditions: (1) All codewords in the C(n) are CM matrices; and (2) Half of the codewords in the C(n) are CM matrices, and the other half of the codewords in the C(n) are not CM matrices.

Figure 6:
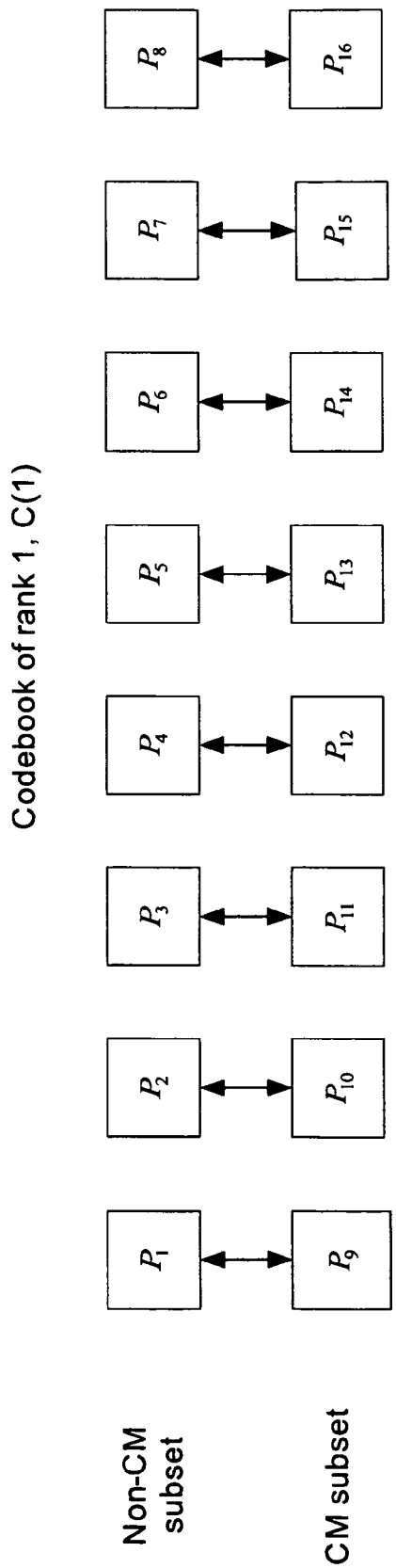
FIG. 6 schematically illustrates a mapping scheme from a subset of non-constant modulus codewords to a subset of constant modulus codewords within a codebook in accordance with an embodiment of the principles of the present invention.

After the set of codebooks are obtained for all ranks, the additional intra-codebook mapping step is performed as follows for C(n). First, if all the codewords in C(n) are CM matrices, no mapping is needed. If half of the codewords in C(n) are CM matrices and the other half of the codewords are not CM matrices, a one-to-one mapping scheme is established between the subset of CM codewords and the subset of non-CM codewords. For example, the block diagram in FIG. 6 shows how the one-to-one mapping is established for the codebook C(1) of rank 1. In this example, the first eight codewords of C(1), i.e., $P_1$ through $P_8$, are CM matrices, and the other eight codewords of C(1), i.e., $P_9$ through $P_{16}$, are not CM matrices. This mapping scheme between subsets of a given codebook C(n) is known at both the Node-B and the UE.

Figure 7:
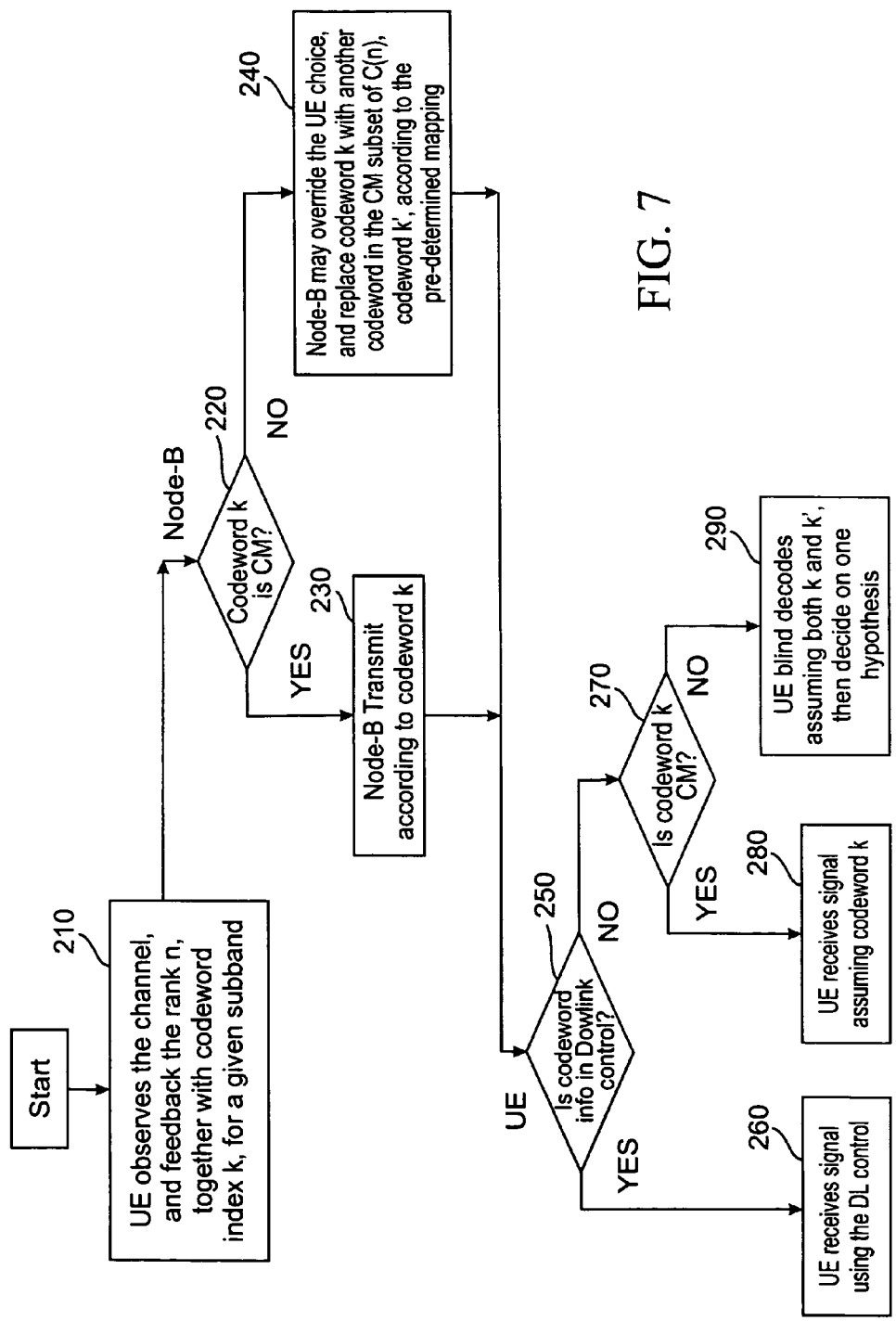
FIG. 7 illustrates a flow chart for a unit of user equipment and a Node-B procedure in a single user MIMO preceding scheme in accordance with another embodiment of the principles of the present invention.

The UE and Node-B behaviors in this MIMO precoding system is described as in FIG. 7. Here both Node-B and the UE are aware of the set of codebooks C(n), as well as the one-to-one mapping scheme between the CM and non-CM subsets within a given codebook. First, the UE observes a channel condition, and feeds back the rank number together with the codeword index k, for a given subband via step 210. If the Node-B detects the power imbalance, i.e., the codeword selected by the UE is not a CM matrix, the Node-B has an option to override the non-CM codeword selected by the UE, and replaces the non-CM codeword with the CM codeword. The CM codeword is chosen according to the pre-determined mapping scheme between the non-CM subset of the codebook and CM subset of the codebook. Specifically, as shown in FIG. 7, after receiving the codeword index k, the Node-B determined whether the codeword k is a constant modulus matrix via step 220. If the codeword k is a constant modulus matrix, the Node-B transmits data according to the codeword k via step 230. Otherwise, the Node-B may override the UE choice, and may replace the codeword k with another codeword k' that is a constant modulus matrix, according to a certain mapping scheme. Additionally, the UE determines whether the Node-B sends information regarding the UE codeword choice in the downlink control channel via step 250. If the Node-B sends information regarding the UE codeword choice in the downlink control channel, the UE performs detection and decoding by using this information via step 260. If the Node-B does not send information regarding the UE codeword choice in the downlink control channel, the UE will perform either one of the following steps. The UE determines whether the current codebook contains all CM matrices, i.e., the codeword k selected by the UE is a CM codeword via step 270. If the codeword k is a CM codeword, the UE will assume that the Node-B is using the codeword choice that UE has sent in the uplink feedback; and will detect and decode the received data accordingly via step 280. Otherwise, if not all of the codewords in the current codebook are CM matrices, the UE will blindly decode the received data by using two assumptions via step 290. Specifically, the UE may first attempt to decode the received data using the non-CM codeword choice that the UE has sent in the uplink. If the received data does not decodes, the UE may attempt to decode the received data by using the CM codeword that corresponds to the non-CM codeword choice that the UE has sent in the uplink, according to the pre-determined one-to-one mapping scheme between the CM and non-CM subsets within this codebook.

In a second embodiment according to the principles of the present invention, a codebook designed according to the above method is applied to a MIMO system where the Node-B antennas are dual-polarized. The polarization at the Node-B can be either vertical-horizontal or +45 and −45 degrees.

In a third embodiment according to the principles of the present invention, we propose to use a single codebook that contains all CM matrices for both single-polarization and dual-polarization system where Node-B has four transmission antennas. In a system where Node-B is dual-polarized, however, we define additional UE feedback to report whether UE is receiving energy from first polarization, second polarization, or both polarizations. That is, the Node-B first transmits a pilot signal or a reference signal to the UE. In response to the receiving of the pilot signal, the UE reports whether the UE is receiving signals from the antennas that are oriented with a first polarization, or from the antennas that are oriented with a second polarization, or from both of the antennas with the first polarization and the antennas with the second polarization. This feedback is called POL (for "polarization") and is of size 2 (bits), in order to represent the three states of polarization that the UE is in. The three states of polarization are defined by: (a) POL="First", indicating first polarization; (b) POL="Second", indicating second polarization; (c) POL="Both", indicating both polarization.

There are three possible modes for feeding-back the POL field by a given UE: (1) semi-static feedback of POL; (2) feedback dynamically, but feedback only one POL for each subframe, across all subbands; and (3) feedback dynamically on a per-subband basis. In the 3GPP LTE system, semi-statically is typically used to describe a time-scale on the order of >20-100 ms, whereas dynamically is typically used to describe a time-scale on the order of several milliseconds (ms).

In addition, if POL field is present in the feedback, then the channel quality index (CQI) calculation as well as precoding matrix index (PMI) calculation should follow one of the following two alternatives, Alternative 1 and Alternative 2. The precoding matrix index refers to the index of the codebook in the precoding codebook. The Node-B may send in the downlink one bit semi-statically to instruct the UE regarding which one of the two alternatives, Alternative 1 and Alternative 2, to be used to calculate the CQI and PMI. Or, the UE may send an additional bit in the feedback to indicate which alternative is used.

In the first alternative (Alternative 1) for CQI and PMI calculation, the UE calculates the CQI and PMI according to the full-CM codebook, and the calculation is independent of the POL value. In addition, the UE reports the CM codeword index to the Node-B.

In the second alternative (Alternative 2) for CQI and PMI calculation, the CQI and PMI calculation is dependent on the POL value. If POL="First", the UE assumes zero values in the rows that corresponds to the second-polarization for all codewords, and then calculates the CQI and PMI. If POL="Second", the UE assumes zero values in the rows that corresponds to the first-polarization for all codewords, and then calculates the CQI and PMI. If POL="Both", the UE calculates the CQI and PMI according to the original CM codebook.

If Alternative 1 is used for CQI and PMI calculation at the UE side, then Node-B performs the normal precoding operation by using the CM codeword that UE reports in the feedback. The Node-B transmits data by using all of the transmission antennas, and there is no power amplifier (PA) balance issue.

If Alternative 2 is used for CQI and PMI calculation at the UE side, then for a given subband, the Node-B picks the codeword for preceding according to the PMI feedback. In addition, the Node-B will perform a "Polarization Nulling" step according to POL value. If POL="First", the Node-B does not transmit on the two antennas corresponding to the second polarization; that is, the Node-B only transmits on the two antennas corresponding to the first polarization. If POL="Second", the Node-B does not transmit on the two antennas corresponding to the first polarization. If POL="Both", no 'Polarization Nulling' is performed on this subband.

In addition, the Node-B needs an additional step to ensure PA balance is satisfied across all transmission antennas. If the Node-B detects PA imbalance, the Node-B will decide on a set of subbands in which the Node-B reverts the "Polarization Nulling" operation, and as a result achieving PA balance. The Node-B detects whether the PA is balanced by looking at the preceding matrices being used in all subbands, the Node-B will know if PA imbalance is taking place in a particular subband. Note that since the CQI is calculated by assuming the "Polarization Nulling" operation, the Node-B will need to properly scale the CQI to mitigate the performance loss due to inaccurate link adaptation.

For example, we may associate a rank 1 codeword in such as way that the first two rows are associated with first polarization, and the next two rows are associated with second polarization as follows:

$$\begin{bmatrix} 1 \\ j \\ -j \\ 1 \end{bmatrix} \begin{matrix} <- \text{ First Poloarization} \\ <- \text{ First Poloarization} \\ <- \text{ Second Poloarization} \\ <- \text{ Second Poloarization} \end{matrix} \qquad (7)$$

At a given moment, the UE may decide that POL="First", indicating most of the received energy comes from the first two Node-B transmission antennas. If the Alternative 2 of CQI/PMI calculation is assumed, then the UE will calculate both CQI and PMI pretending that the third and fourth rows of all codewords are zeros. Without loss of generality, let us assume that the resulting PMI indicates the vector $[1\ j\ -j\ 1]^T$, and is fed back to the Node-B together with the corresponding CQI.

At the Node-B, after the 'Polarization Nulling', the Node-B initially selects the effective precoding matrix of $[1\ j\ 0\ 0]^T$. If the Node-B decides to revert the 'Polarization Nulling' operation for this sub-band to satisfy the PA balance requirement, the Node-B will use the CM precoding matrix of $[1\ j\ -j\ 1]^T$.

Figure 8:
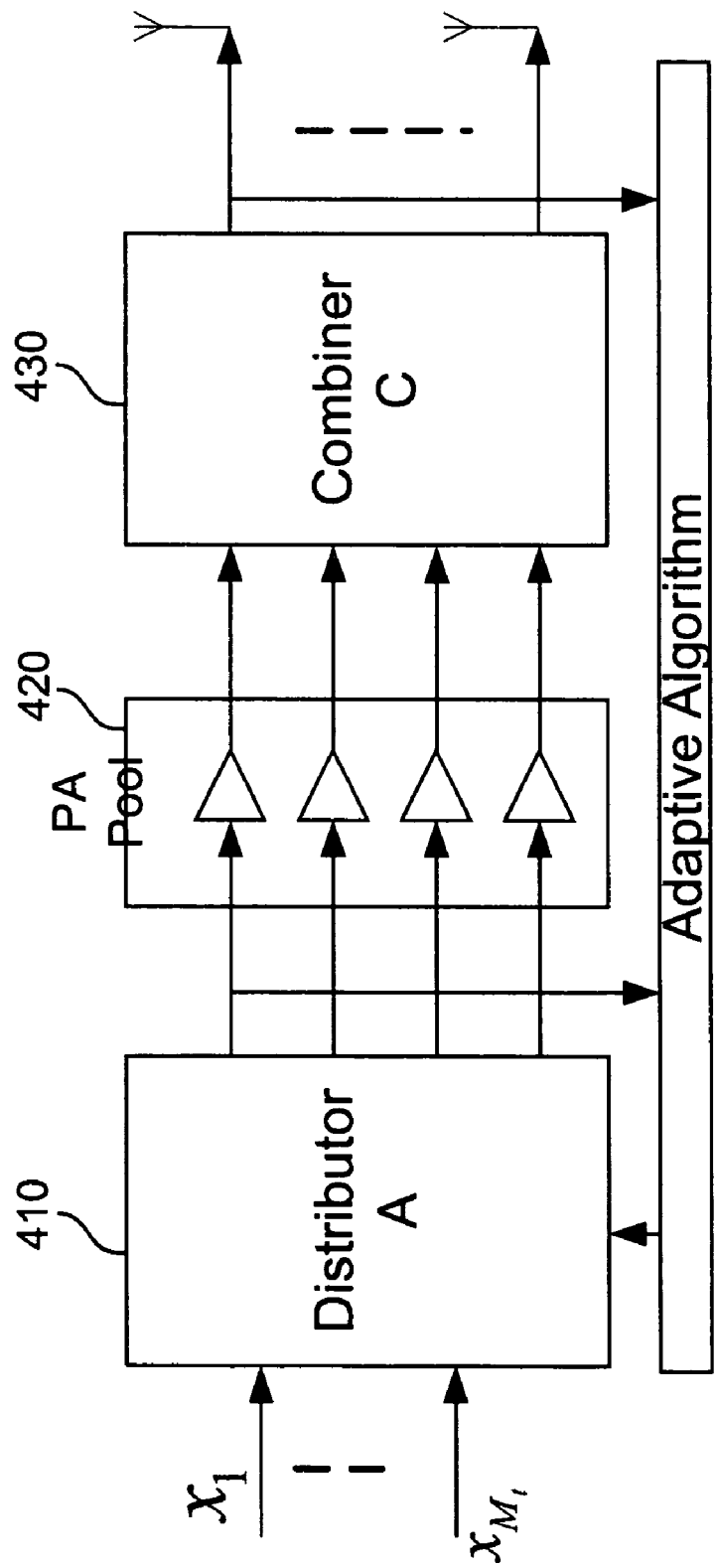
FIG. 8 schematically illustrates a power amplifier pooling apparatus in accordance with an embodiment of the principles of the present invention.

In a fourth embodiment according to the principles of the present invention, the PAs could be balanced by using a Power Amplifier (PA) Pool apparatus included in an antenna system as shown in FIG. 8. The PA Pool apparatus is constructed with a distributor 410, a power amplifier pool section 420 including a plurality of power amplifiers, and a combiner 430. Distributor 410 distributes M, input signals $x_1, \ldots, x_{M_1}$, of respective sector to the power amplifiers of power amplifier pool section 420 in accordance with a distributor matrix A. The power amplifiers of power amplifier pool section 420 amplify the signals distributed by distributor 410. Combiner 430 restores respective sector output signals by combining the signals amplifier by the power amplifiers of power amplifier pool section 420 in accordance with a combiner matrix C.

We propose here to use a 4×4 distributor matrix A which has the following form:

$$A = \begin{bmatrix} x & 0 & x & 0 \\ 0 & x & 0 & x \\ x & 0 & x & 0 \\ 0 & x & 0 & x \end{bmatrix}, \qquad (8)$$

where x means any constant modulus symbol from any Binary phase-shift keying (BPSK), Quadrature phase-shift keying (QPSK), order-8 phase-shift keying (8PSK) or order-16 phase-shift keying (16PSK) alphabet. The BPSK symbols are 1 and −1. The QPSK symbols are given by $$e^{j\frac{(2k-1)\pi}{4}},$$

where $j=\sqrt{-1}$, and k=1, . . . , 4. The 8PSK symbols are given by $$e^{j\frac{(2k-1)\pi}{8}},$$

where $j=\sqrt{-1}$, and k=1, . . . , 8. The 16PSK symbols are given by $$e^{j\frac{(2k-1)\pi}{16}},$$

where $j=\sqrt{-1}$, and k=1, . . . , 16. We propose to use a combiner matrix which is the inverse of A, namely $C=A^{-1}$.

In a fifth embodiment according to the principles of the present invention, we could use a distributor as $$A = \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix} \qquad (9)$$

with again $C=A^{-1}$.

Figure 9:
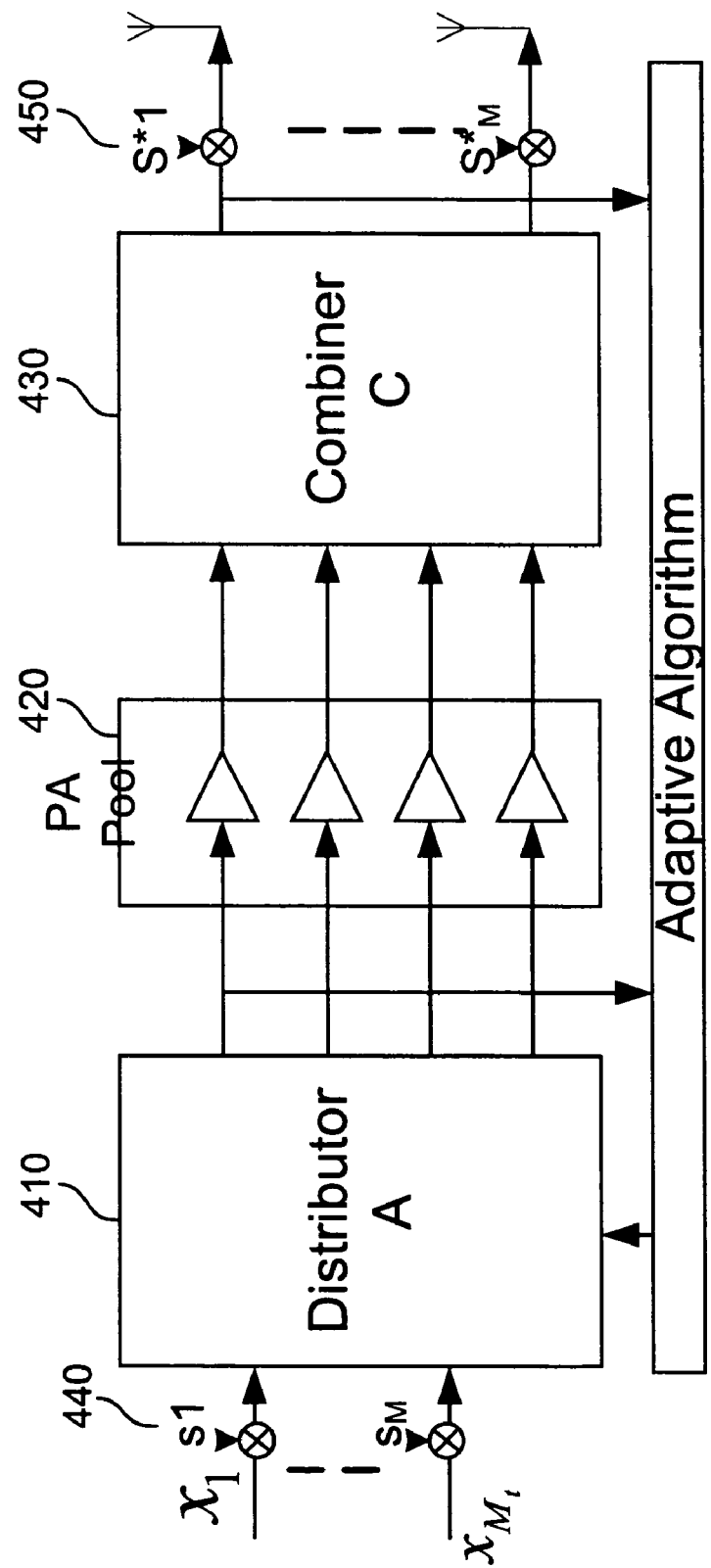
FIG. 9 schematically illustrates a power amplifier pooling apparatus with a scrambling sequence and a descrambling sequence in accordance with another embodiment of the principles of the present invention.

In a sixth embodiment according to the principles of the present invention as shown in FIG. 9, the input signals $x_1, \ldots, x_{M_1}$, to distributor 410 is scrambled by M, scramblers 440 $s_1, \ldots s_{M_1}$, so that the input signals are independent. The independence of the input signals $x_1, \ldots, x_{M_1}$, ensures that the input covariance to PA pool section 420 is a diagonal matrix which will ensure that the power amplifiers in PA pool section 420 are equally loaded. This is followed by descrambling the output of the combiner appropriately by M, descramblers 450 $s^*_1, \ldots s^*_{M_1}$, in order to ensure that the transmitted signals are not scrambled. Note that the scrambling sequence can be any pseudo-random sequence, for example, the M-sequence, or the Gold sequence. The descrambling sequence is the same as the scrambling sequence. In addition, the distributor matrix in distributor 410 is the same as the distributor matrix A set forth in Equation (8).

While the present invention has been shown and described in connection with the preferred embodiments, it will be apparent to those skilled in the art that modifications and variations can be made without departing from the spirit and scope of the invention as defined by the appended claims.

What is claimed is:

1. A method for communication, the method comprising the steps of:
    generating a codebook comprising a first set of codewords and a second set of codewords, with each one of the first set of codewords being a constant modulus matrix, and each one of the second set of codewords being a non-constant modulus matrix;
    establishing a mapping scheme from the codewords in the first set of codewords to the codewords in the second set of codewords;
    transmitting, via a first node to a second node, information regarding a first codeword selected from the codebook in dependence upon a condition of a transmission channel between first node and the second node in a multiple input multiple output communication system;
    determining, at the second node, whether the first codeword selected by the first node is a constant modulus matrix or a non-constant modulus matrix; and
    when the second node determines that the first codeword selected by the first node is a non-constant modulus matrix, replacing, by the second node, the first codeword with a second codeword that is selected from the first set of codewords and that corresponds to the first codeword in accordance with the mapping scheme established.

2. The method of claim 1, comprised of the second node comprising four transmission antennas, and the codebook for a transmission rank-four of the four transmission antennas comprising four matrices $W_1, W_2, W_3$ and $W_4$ established by:

$$W_1 = \begin{bmatrix} A & 0 \\ 0 & B \end{bmatrix}$$

$$W_2 = \begin{bmatrix} C & 0 \\ 0 & D \end{bmatrix}$$

$$W_3 = [E]$$

$$W_4 = [F]$$

where each of A, B, C and D is a 2×2 constant modulus matrix, and each of E and F is a 4×4 constant modulus matrix.

3. The method of claim 2, comprised of each element of A, B, C and D being a symbol selected from a set of Quadrature phase-shift keying (QPSK) modulation symbols given by $$e^{j\frac{(2k-1)\pi}{4}},$$

where $j=\sqrt{-1}$, and $k=1, \ldots, 4$, a set of order-8 phase-shift keying (8PSK) modulation symbols given by $$e^{j\frac{(2k-1)\pi}{8}},$$

where $j=\sqrt{-1}$, and $k=1, \ldots, 8$, a set of order-16 phase-shift keying (8PSK) modulation symbols given by $$e^{j\frac{(2k-1)\pi}{16}},$$

where $j=\sqrt{-1}$, and $k=1, \ldots, 16$, and a set of binary phase shift keying (BPSK) modulation symbols 1 and −1.

4. The method of claim 2, comprised of the codebook for a transmission rank-one of the four transmission antennas comprising sixteen matrices, with each of the sixteen matrices being a unique column vector selected from the four matrices $W_1$, $W_2$, $W_3$ and $W_4$.

5. The method of claim 2, comprised of the codebook for a transmission rank-two of the four transmission antennas comprising sixteen matrices, with each of the sixteen matrices being one selected from all possible 4×2 submatrices of the four matrices $W_1$, $W_2$, $W_3$ and $W_4$.

6. The method of claim 2, comprised of the codebook for a transmission rank-four of the four transmission antennas comprising sixteen matrices, with each of the sixteen matrices being one selected from all possible 4×3 submatrices of the four matrices $W_1$, $W_2$, $W_3$ and $W_4$.

7. The method of claim 2, comprised of the four transmission antennas being dual polarized antennas.

8. The method of claim 7, comprised of the dual polarization being vertical and horizontal.

9. The method of claim 7, comprised of the dual polarization being 45 degree and −45 degree.

10. A method for communication, the method comprising the steps of:
generating codebooks for various transmission ranks in a communication system, with each of the codebooks being one of a first type codebook in which all of the codewords are constant modulus matrices, and a second type codebook in which a first half of the codewords are constant modulus matrices, and a second half of the codewords are non-constant modulus matrices;
establishing a mapping scheme, for each one of the second type codebooks, from the first half of the codewords to the second half of the codewords;
transmitting, via a first node to a second node, information regarding a transmission rank and information regarding a first codeword selected from a codebook corresponding to the transmission rank, with the first codeword being selected in dependence upon a condition of a transmission channel between first node and the second node in a multiple input multiple output communication system;
determining, at the second node, whether the first codeword selected by the first node is a constant modulus matrix or a non-constant modulus matrix;
when the second node determines that the first codeword selected by the first node is a constant modulus matrix, precoding and transmitting a data packet, at the second node, by using the first codeword; and
when the second node determines that the first codeword selected by the first node is a non-constant modulus matrix, replacing, by the second node, the first codeword with a second codeword that is selected from the first half of the codewords in the codebook and that corresponds to the first codeword in accordance with the mapping scheme established corresponding to the codebook, and preceding and transmitting a data packet by using the second codeword.

11. The method of claim 10, further comprising the steps of:
transmitting a control signal and the precoded data packet via the second node to the first node;
in response to the control signal and the data packet received, determining, at the first node, whether the control signal comprises information regarding the codeword used to precode the data packet;
when the control signal comprises information regarding the codeword used to precode the data packet, decoding, at the first node, the data packet by using the codeword corresponding to the information comprised in the control signal;
when the control signal does not comprise information regarding the codeword used to precode the data packet, determining, at the first node, whether the codebook corresponding to the transmission rank is the first type codebook;
when the codebook corresponding to the transmission rank is the first type codebook, decoding, at the first node, the data packet by using the first codeword selected by the first node; and
when the codebook corresponding to the transmission rank is the second type codebook, blindly decoding, at the first node, the data packet by using both of the first codeword selected by the first node and the second codeword selected by the second node.

12. The method of claim 10, comprised of the second node comprising four transmission antennas, and a transmission rank-four codebook for the four transmission antennas comprising four matrices $W_1$, $W_2$, $W_3$ and $W_4$ established by:

$$W_1 = \begin{bmatrix} A & 0 \\ 0 & B \end{bmatrix}$$

$$W_2 = \begin{bmatrix} C & 0 \\ 0 & D \end{bmatrix}$$

$$W_3 = [E]$$

$$W_4 = [F]$$

where each of A, B, C and D is a 2×2 constant modulus matrix, and each of E and F is a 4×4 constant modulus matrix.

13. The method of claim 12, comprised of each element of A, B, C and D being a symbol selected from a set of Quadrature phase-shift keying (QPSK) modulation symbols given by $$e^{j\frac{(2k-1)\pi}{4}},$$

where $j=\sqrt{-1}$, and k=1, . . . , 4, a set of order-8 phase-shift keying (8PSK) modulation symbols given by $$e^{j\frac{(2k-1)\pi}{8}},$$

where $j=\sqrt{-1}$, and k=1, . . . , 8, a set of order-16 phase-shift keying (8PSK) modulation symbols given by $$e^{j\frac{(2k-1)\pi}{16}},$$

where $j=\sqrt{-1}$, and k=1, . . . , 16, and a set of binary phase shift keying (BPSK) modulation symbols 1 and −1.

14. The method of claim 12, comprised of a rank-one codebook for the four dual polarized transmission antennas comprising sixteen matrices, with each of the sixteen matrices being a unique column vector selected from the four matrices $W_1$, $W_2$, $W_3$ and $W_4$.

15. The method of claim 12, comprised of a rank-two codebook for the four dual polarized transmission antennas comprising sixteen matrices, with each of the sixteen matrices being one matrix selected from all possible 4×2 submatrices of the four matrices $W_1$, $W_2$, $W_3$ and $W_4$.

16. The method of claim 12, comprised of a rank-three codebook for the four dual polarized transmission antennas comprising sixteen matrices, with each of the sixteen matrices being one matrix selected from all possible 4×3 submatrices of the four matrices $W_1$, $W_2$, $W_3$ and $W_4$.

17. The method of claim 12, comprised of the four transmission antennas being dual polarized antennas.

18. A method for communication, the method comprising the steps of:
  generating a codebook comprising a plurality of codewords, with each of the codewords being a constant modulus matrix;
  transmitting a reference signal, from a second node to a first node, via a plurality of transmission antennas;
  in response to the reference signal received, feeding back, via the first node to the second node, a polarization indicator indicating whether the first node receives energy from a first subset of the transmission antennas that are oriented with a first polarization, or from a second subset of the transmission antennas that are oriented with a second polarization, or from both of the first subset and the second subset of the transmission antennas;
  transmitting, from the second node to the first node, an alternative indicator indicating which one of two alternatives to be used by the first node to calculate a channel quality indicator and a preceding matrix index;
  calculating the channel quality indicator and the precoding matrix index at the first node by using one of two alternatives, with:
    in the first alternative, calculating the channel quality indicator and the precoding matrix index by using the codewords in the codebook; and
    in the second alternative, calculating the channel quality indicator and the precoding matrix index in dependence upon the polarization indicator, with:
      when the polarization indicator indicates that the first node receives energy from the first subset of the transmission, revising all of the codewords in the codebook by replacing the rows that correspond to the second subset of the transmission antennas with zero values, and calculating the channel quality indicator and the preceding matrix index by using the revised codewords;
      when the polarization indicator indicates that the first node receives energy from the second subset of the transmission, revising all of the codewords in the codebook by replacing the rows that correspond to the first subset of the transmission antennas with zero values, and calculating the channel quality indicator and the preceding matrix index by using the revised codewords; and
      when the polarization indicator indicates that the first node receives energy from both of the first subset and the second subset of the transmission antennas, calculating the channel quality indicator and the preceding matrix index by using the codewords in the codebook without any revision;
  transmitting, via the first node to the second node, the calculated channel indicator and the precoding matrix index; and
  in response to the channel indicator, the precoding matrix index and the alternative indicator received, preceding and transmitting a data packet in dependence upon the alternative indicator, with:
    when the alternative indicator indicates that the first alternative is used for calculating the channel indicator and the preceding matrix index, precoding the data packet by using a codeword selected from the plurality of codewords in the codebook in accordance with the precoding matrix index, and transmitting the precoded data packet via the plurality of transmission antennas; and
    when the alternative indicator indicates that the second alternative is used for calculating the channel indicator and the preceding matrix index, precoding the data packet by using a codeword selected from the plurality of codewords in the codebook in accordance with the precoding matrix index, and transmitting the precoded data packet in dependence upon the polarization indicator, with
      when the polarization indicator indicates that the first node receives energy from the first subset of the transmission antennas, transmitting the precoded data packet via at least one of the first subset of the transmission antennas;
      when the polarization indicator indicates that the first node receives energy from the second subset of the transmission antennas, transmitting the precoded data packet via at least one of the second subset of the transmission antennas; and
      when the polarization indicator indicates that the first node receives energy from both of the first subset and the second subset of the transmission antennas, transmitting the precoded data packet via at least one of the first subset and the second subset of transmission antennas.

19. The method of claim 18, comprised of the first node feeding back the polarization indicator semi-statically.

20. The method of claim 18, comprised of the first node dynamically feeding back one polarization indicator for each subframe across all subbands.

21. The method of claim 18, comprised of the first node dynamically feeding back one polarization indicator for each subband.

22. The method of claim 18, further comprising the steps of:

detecting, by the second node, whether there is a power amplifier imbalance; and when the second node detects a power amplifier imbalance, and the second alternative was used to calculate the channel quality indicator and the precoding matrix index, precoding and transmitting the data packet, for a set of subbands, by using the original codebook without any revision, and preceding and transmitting the data packet for the other subbands by using the revised codebook.

23. A method for transmitting data, the method comprising the steps of:

distributing a plurality of signals output from respective sectors of a signal generator in accordance with a distributor matrix A at a distributor in a transmitter with four transmission antennas, with the distributor matrix A being established by:

$$A = \begin{bmatrix} x & 0 & x & 0 \\ 0 & x & 0 & x \\ x & 0 & x & 0 \\ 0 & x & 0 & x \end{bmatrix}$$

where x is a constant modulus symbol;

amplifying the distributed signals by using a plurality of power amplifiers in a power amplifier pool section;

combining the amplified signals in accordance with a combiner matrix C at a combiner in the transmitter, with $C=A^{-1}$; and transmitting the combined signals via the four transmission antennas.

24. The method of claim 23, comprised of x being the constant modulus symbol selected from a set of Quadrature phase-shift keying (QPSK) modulation symbols given by $$e^{j\frac{(2k-1)\pi}{4}},$$

where $j=\sqrt{-1}$, and k=1, . . . , 4, a set of order-8 phase-shift keying (8PSK) modulation symbols given by $$e^{j\frac{(2k-1)\pi}{8}},$$

where $j=\sqrt{-1}$, and k=1, . . . , 8, a set of order-16 phase-shift keying (8PSK) modulation symbols given by $$e^{j\frac{(2k-1)\pi}{16}},$$

where $j=\sqrt{-1}$, and k=1, . . . , 16, and a set of binary phase shift keying (BPSK) modulation symbols 1 and −1.

25. A method for transmitting data, the method comprising the steps of:

distributing a plurality of signals output from respective sectors of a signal generator in accordance with a distributor matrix A at a distributor in a transmitter with four transmission antennas, with the distributor matrix A being established by:

$$A = \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix};$$

amplifying the distributed signals by using a plurality of power amplifiers in a power amplifier pool section; and combining the amplified signals in accordance with a combiner matrix C at a combiner in the transmitter, with $C=A^{-1}$;

transmitting the combined signals via the four transmission antennas.

26. A method for transmitting data, the method comprising the steps of:

scrambling a plurality of signals output from respective sectors of a signal generator by a plurality scramblers in a transmitter to make the signals independent from each other;

distributing the scrambled signals in accordance with a distributor matrix A at a distributor, with the distributor matrix A being established by:

$$A = \begin{bmatrix} x & 0 & x & 0 \\ 0 & x & 0 & x \\ x & 0 & x & 0 \\ 0 & x & 0 & x \end{bmatrix}$$

where x is a constant modulus symbol being selected from a set of Quadrature phase-shift keying (QPSK) modulation, a set of order-8 phase-shift keying (8PSK) modulation symbols, a set of order-16 phase-shift keying (8PSK) modulation symbols, and a set of binary phase shift keying (BPSK) modulation symbols;

amplifying the distributed signals by a plurality of power amplifiers in a power amplifier pool section; and combining each of the amplifier signals in accordance with a combiner matrix at a combiner in the transmitter;

descrambling the combined signals by a plurality of descramblers;

transmitting the descrambled signals via a plurality of antennas.

27. An apparatus communication in a wireless communication system, comprising:

a memory unit storing a codebook comprising a first set of codewords and a second set of codewords, with each one of the first set of codewords being a constant modulus matrix, and each one of the second set of codewords being a non-constant modulus, and the first set of codewords corresponding to the second set of codewords in accordance with a one-to-one mapping scheme;

a precoding unit encoding a data packet to be transmitted to a wireless terminal by using one of a first codeword selected by the wireless terminal when the first codeword is a constant modulus matrix, and a second codeword that corresponds to the first codeword in accordance with the mapping scheme when the first codeword is a non-constant modulus matrix; and a plurality of transmission antennas for transmitting the precoded data packet.

28. The apparatus of claim 27, comprised of the transmission antennas being dual polarized antennas.

29. An apparatus for communication, comprising:
a signal generator generating a plurality of signals;
a distributor distributing the plurality of signals output from the signal generator in accordance with a distributor matrix A, with the distributor matrix A being established by:

$$A = \begin{bmatrix} x & 0 & x & 0 \\ 0 & x & 0 & x \\ x & 0 & x & 0 \\ 0 & x & 0 & x \end{bmatrix}$$

where x is a constant modulus symbol;
a power amplifier pool section comprising a plurality of power amplifiers amplifying the distributed signals output from the distributor;
a combiner combining the amplified signals output from the power amplifier pool section in accordance with a combiner matrix C, with $C=A^{-1}$; and
four transmission antennas for transmitting the combined signals output from the combiner.

30. The apparatus of claim 29, comprised of x being the constant modulus symbol selected from a set of Quadrature phase-shift keying (QPSK) modulation symbols given by $$e^{j\frac{(2k-1)\pi}{4}},$$

where $j=\sqrt{-1}$, and k=1, ..., 4, a set of order-8 phase-shift keying (8PSK) modulation symbols given by $$e^{j\frac{(2k-1)\pi}{8}},$$

where $j=\sqrt{-1}$, and k=1, ..., 8, a set of order-16 phase-shift keying (8PSK) modulation symbols given by $$e^{j\frac{(2k-1)\pi}{16}},$$

where $j=\sqrt{-1}$, and k=1, ..., 16, and a set of binary phase shift keying (BPSK) modulation symbols 1 and −1.

31. An apparatus for communication, comprising:
a signal generator generating a plurality of signals;
a distributor distributing the plurality of signals output from the signal generator in accordance with a distributor matrix A, with the distributor matrix A being established by:

$$A = \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix};$$

a power amplifier pool section comprising a plurality of power amplifiers amplifying the distributed signals output from the distributor;
a combiner combining the amplified signals output from the power amplifier pool section in accordance with a combiner matrix C, with $C=A^{-1}$; and
four transmission antennas for transmitting the combined signals output from the combiner.

32. An apparatus for communication, comprising:
a signal generator generating a plurality of signals;
a plurality of scramblers scrambling the signals output from the signal generator to make the signals independent from each other;
a distributor distributing the plurality of signals output from the scramblers in accordance with a distributor matrix A, with the distributor matrix A being established by:

$$A = \begin{bmatrix} x & 0 & x & 0 \\ 0 & x & 0 & x \\ x & 0 & x & 0 \\ 0 & x & 0 & x \end{bmatrix}$$

where x is a constant modulus symbol being selected from a set of Quadrature phase-shift keying (QPSK) modulation, a set of order-8 phase-shift keying (8PSK) modulation symbols, a set of order-16 phase-shift keying (8PSK) modulation symbols, and a set of binary phase shift keying (BPSK) modulation symbols;
a power amplifier pool section comprising a plurality of power amplifiers amplifying the distributed signals output from the distributor;
a combiner combining the amplified signals output from the power amplifier pool section in accordance with a combiner matrix;
a plurality of descramblers descrambling the combined signals output from the combiner; and
four transmission antennas for transmitting the descrambled signals output from the descrambler.

* * * * *